United States Patent
Kawashima et al.

(10) Patent No.: US 6,339,580 B1
(45) Date of Patent: Jan. 15, 2002

(54) APPARATUS AND METHOD OF FORMING EVALUATION SIGNAL USED IN ADJUSTING FOCUS BIAS AND ADJUSTING SKEW OF DISK DRIVE

(75) Inventors: Tetsuji Kawashima; Mamoru Akita, both of Kanagawa; Shunji Yoshimura, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/240,301

(22) Filed: Jan. 29, 1999

Related U.S. Application Data

(62) Division of application No. 08/914,934, filed on Aug. 20, 1997.

(30) Foreign Application Priority Data

Aug. 21, 1996 (JP) ............................................ 08-237364

(51) Int. Cl.⁷ ................................................. G11B 7/00
(52) U.S. Cl. ............................. 369/124.01; 369/53.34; 369/59.17; 369/59.2; 369/44.29
(58) Field of Search ......................... 369/44.32, 124.01, 369/44.33, 44.41, 44.45, 44.36, 44.34, 54.58, 275.4, 275.3, 44.29, 53.22, 44.25, 44.31, 53.34, 59.17, 59.19, 59.2

(56) References Cited

U.S. PATENT DOCUMENTS

| | | | |
|---|---|---|---|
| 4,674,078 A | * | 6/1987 | Otsuka et al. ............ 369/44.32 |
| 5,001,690 A | * | 3/1991 | Kamiya et al. ........... 369/44.32 |
| 5,475,664 A | * | 12/1995 | Shimizume et al. ...... 369/44.29 |
| 5,541,900 A | * | 7/1996 | Ito et al. ................... 369/44.31 |
| 5,546,367 A | * | 8/1996 | Yoshimura et al. ....... 369/44.32 |
| 5,627,807 A | * | 5/1997 | Abe .......................... 369/44.29 |
| 5,675,561 A | * | 10/1997 | Yoshioka .................. 369/44.25 |
| 5,696,756 A | * | 12/1997 | Fujimoto et al. ......... 369/275.4 |
| 5,742,575 A | * | 4/1998 | Yamakawa et al. ....... 369/53.22 |
| 5,751,674 A | * | 5/1998 | Bradshaw et al. ........ 369/44.35 |
| 5,771,214 A | * | 6/1998 | Saga ......................... 369/44.29 |
| 5,805,543 A | * | 9/1998 | Takamine et al. ......... 369/44.32 |
| 5,808,983 A | * | 9/1998 | Tsutsui et al. ............ 369/44.29 |
| 6,115,334 A | * | 9/2000 | Tsutsui et al. ............ 369/44.32 |

* cited by examiner

*Primary Examiner*—David Hudspeth
*Assistant Examiner*—Kim-Kwok Chu
(74) *Attorney, Agent, or Firm*—Frommer, Lawrence & Haug LLP; William S. Frommer; Bruno Polito

(57) ABSTRACT

An apparatus of forming an evaluation signal used in adjusting focus bias and adjusting skew of a disk drive in which phase error information between a phase of a read data signal and a phase of a clock signal formed in synchronism with the read data signal, is detected, the phase error signal is converted into an analog signal and is outputted as an evaluation signal having a signal level in accordance with the phase error amount and the evaluation signal is inputted after A/D conversion to a portion for carrying out signal quality evaluation by using the evaluation signal whereby pertinent signal evaluation can be carried out by a simple constitution.

3 Claims, 13 Drawing Sheets

$r1 > r2 > r3 > r4 > r5 > r6$

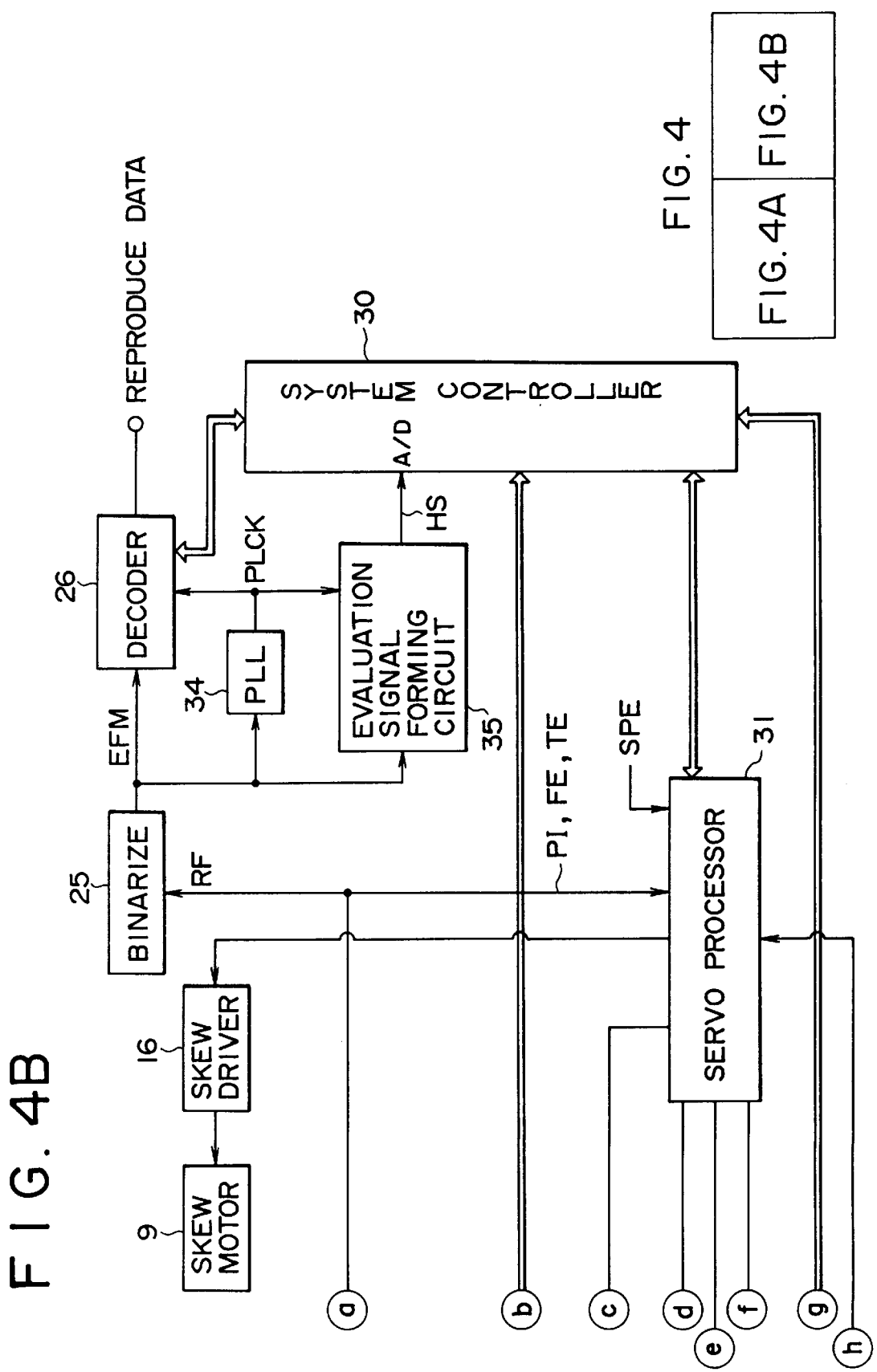

FIG. 8A PLCK
FIG. 8B EFM
FIG. 8C EFMO
FIG. 8D x-PDO
FIG. 8E PDO

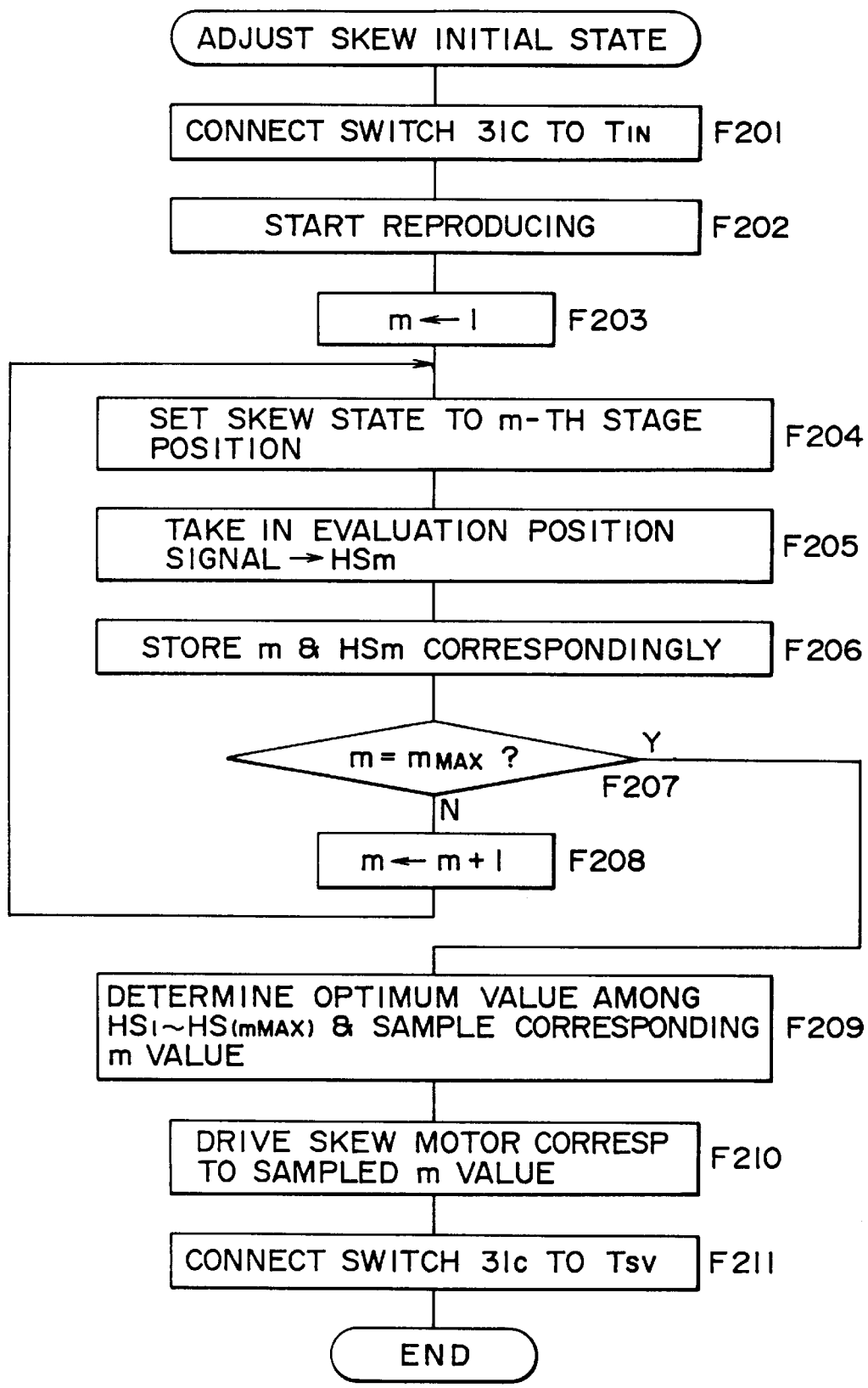

APPARATUS AND METHOD OF FORMING EVALUATION SIGNAL USED IN ADJUSTING FOCUS BIAS AND ADJUSTING SKEW OF DISK DRIVE

CROSS-REFERENCES TO RELATED APPLICATIONS

This is a divisional application of Ser. No. 08/914,934 filed Aug. 20, 1997.

BACKGROUND OF THE INVENTION

1. Field of the Invention

The present invention relates to an evaluation signal forming apparatus suitable for a reproduce drive device in respect of various record media, and a focus bias adjusting method and a skew adjusting method suitable for a drive device in respect of a disk-like record medium.

2. Description of Related Art

CD (Compact Disk) has widely been spread as an optical disk record medium and a disk of CD style is used in various fields including musical usage. Further, a disk referred to as DVD (Digital Versatile Disk/Digital Video Disk) has been developed as an optical disk record medium suitable for multi media usage. DVD is proposed to be adaptable to wide fields of video data, audio data, computer data and the like. Although DVD is a disk (diameter 12 cm) having a size the same as that of CD, the record capacity is remarkably increased by small pitch formation of record track, data compression technology and the like.

Meanwhile, in respect of a reproduce drive device for a record medium of CD, DVD or the like, as a method of evaluating quality of reproduce signal, there is a method of evaluating a jitter component between a signal read from a disk and binarized (for example, EFM signal in CD) and a clock formed by inputting the binarized signal to a PLL circuit (that is, reproduce clock in synchronism with reproduce signal), or the like.

The jitter component is detected as a dispersion or a standard deviation shown by the following Equation (1) and Equation (2) with respect to a phase error between a phase of a binarized signal and a phase of the reproduce clock.

$$\sum_i (Xi - X_{AVG})^2 \quad (1)$$

$$\sqrt{\sum_i (Xi - X_{AVG})^2} \quad (2)$$

where Xi is a value of phase error and $X_{AVG}$ is average value.

FIGS. 1A, 1B, 1C and 1D show an example of an operation for detecting a phase error between a phase of a binarized signal and a phase of a reproduce clock. FIG. 1A indicates a reproduce clock PLCK formed by inputting an EFM signal that is a binarized signal to a PLL circuit and FIG. 13B indicates the EFM signal (8–14 modulated signal). Further, an EFMO signal in FIG. 1C, is a signal formed by supplying the EFM signal to latching means such as a flip flop circuit or the like and latching it at an edge timing of the reproduce clock PLCK.

Incidentally, arising edge of a waveform is referred to as "edge" and a falling edge of a waveform is referred to as "counter edge" for convenience of explanation in the specification.

FIG. 1D indicates a phase error signal PDO and the phase error signal PDO corresponds to a signal showing a time period from an edge of the EFM signal to an edge of the reproduce clock PLCK.

A very large-scaled device such as TIA (Time Interval Analyzer) is needed to calculate standard deviation or dispersion used for signal evaluation from such a phase error signal PDO.

There are focus bias or skew state as factors influencing on the quality of a reproduce signal in a disk drive device. It is preferable to perform adjusting operation to optimize these values while detecting a value in correspondence with a jitter component. However, it is preferable to execute such an adjustment not only in an adjusting step before shipment in a factory but in actually using a disk drive device, for example, at every time of loading a disk. That is, an optimum value (state) for adjusting focus bias or skew are varied by environmental state of using the disk drive device such as temperature or the like, aging change, difference in mechanical/optical properties for individual disks and the like.

However, it is not realistic to mount TIA or the like having a large circuit constitution on a disk drive device in consideration of size and cost of the device. Therefore, it is difficult to adjust focus bias or skew initial state by automatically performing signal evaluation by detecting jitter in, for example, inserting a disk in a disk drive device.

As a method of substituting for signal evaluation using standard deviation, there is a method where an absolute value of the phase error signal PDO is used. That is, the valued is derived from Equation (3).

$$\sum_i |Xi - X_{AVG}| \quad (3)$$

However, in order to determine the absolute value as an evaluation value for various adjustments a signal in accordance with the absolute value must be converted into a numerical value. That is, the pulse width of the phase error signal PDO in FIG. 1D is converted into a numerical value. For that purpose, a clock having high frequency for sampling and measuring the phase error signal PDO, becomes necessary. For example, a clock formed by multiplying a reproduce clock by n or the like is needed.

However, such a clock is difficult to realize since with high transmission rate formation of reproduce data of a disk drive device in recent years, the frequency per se of a reproduce signal from a disk becomes higher and accordingly, the frequency of the clock for measuring the absolute value of the phase error becomes higher.

SUMMARY OF THE INVENTION

It is an object of the present invention in view of such a problem to provide an adjusting method capable of forming and detecting an evaluation signal capable of constituting an evaluation reference of quality of signals by a simple constitution and using the evaluation signal.

For that purpose, an evaluation signal forming apparatus is constituted by phase error detecting means for detecting phase error information between a phase of a read data signal read from a record medium and a clock signal formed in synchronism with the read data signal, and outputting means for outputting an evaluation signal having a signal level in correspondence with the phase error information.

That is, phase error information is not sampled as it is but is converted into an analog signal having the signal level in accordance with the phase error information. Further, when the analog signal is determined as the evaluation signal, a portion (for example, microcomputer) for carrying out signal quality evaluation by using the evaluation signal, takes in the evaluation signal by A/D-converting the evaluation signal.

Further, the focus bias value is varied while monitoring such an evaluation signal and the focus bias value at a time point where the value of the evaluation signal becomes a pertinent value, is set as an adjustment value of the focus bias value.

Also, skew driving is carried out while monitoring the evaluation signal and a skew state at a time point when the value of the evaluation signal becomes a pertinent value, is set as an optimum skew initial state.

Accordingly, by realizing accurate signal evaluation by a simple constitution, the focus bias adjustment, skew initial state adjustment and the like can be automated by a unit of the drive device.

BRIEF DESCRIPTION OF THE DRAWINGS

FIG. 13 is a flowchart of an example of processes of adjusting a skew initial state according to the embodiment.

DETAILED DESCRIPTION OF THE PREFERRED EMBODIMENTS

An explanation will be given of embodiments of the present invention in the following order showing examples of disk drive devices in correspondence with CD and DVD as follows.

1. Constitution of a disk drive device
2. Constitution and operation of an evaluation signal forming circuit
3. Focus bias adjusting operation
4. Skew initial state adjusting operation 1. Constitution of a Disk Drive Device An explanation will be given of the constitution of a disk drive device having interchangeability with respect to CD and DVD in reference to FIG. 2 through FIG. 5. The disk drive device is provided with a pickup in correspondence with CD and a pickup in correspondence to DVD. Incidentally, CD and DVD are generally referred to as disk D.

Figure 1:
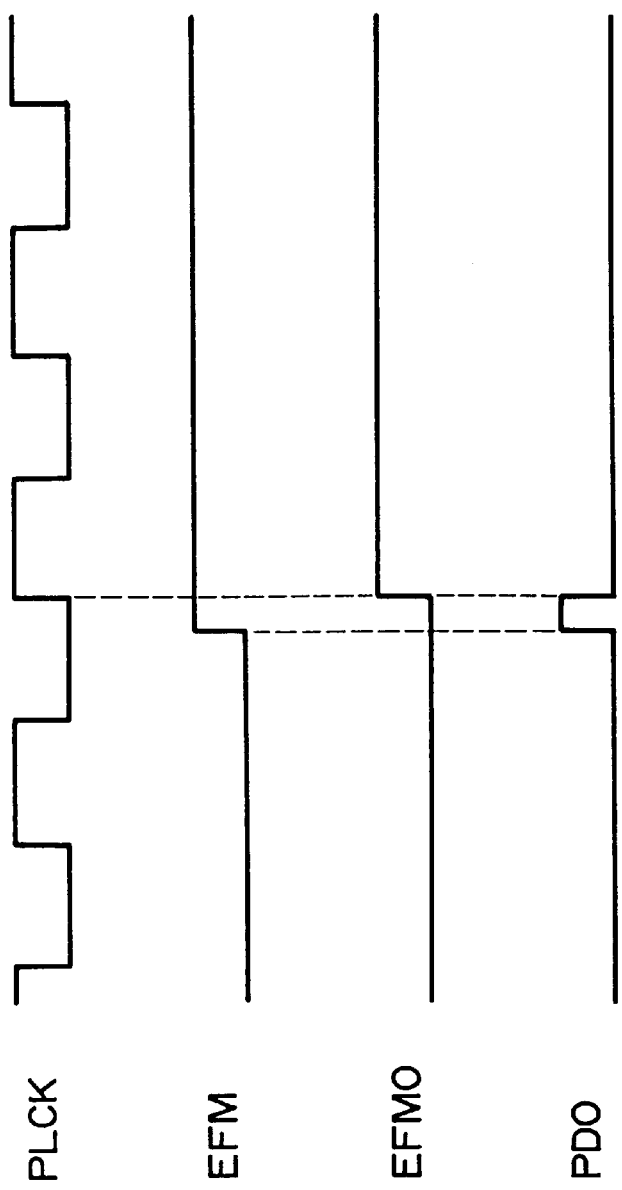
FIGS. 1A, 1B, 1C and 1D are explanatory views of waveforms for detecting a phase error.
Figure 2:
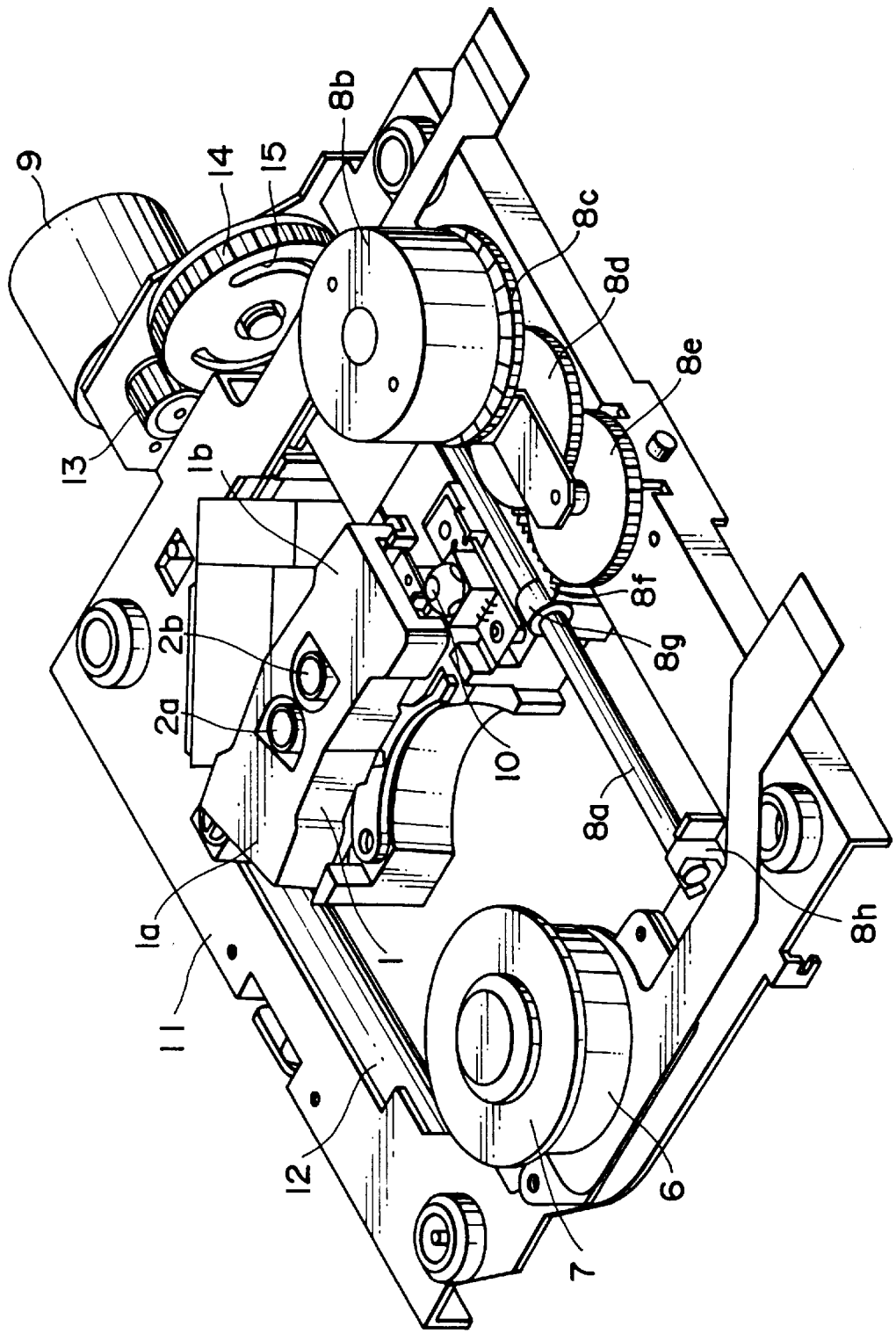
FIG. 2 is a perspective view of a mechanism deck of a disk drive device on which an evaluation signal forming apparatus according to an embodiment is mounted.
Figure 3:
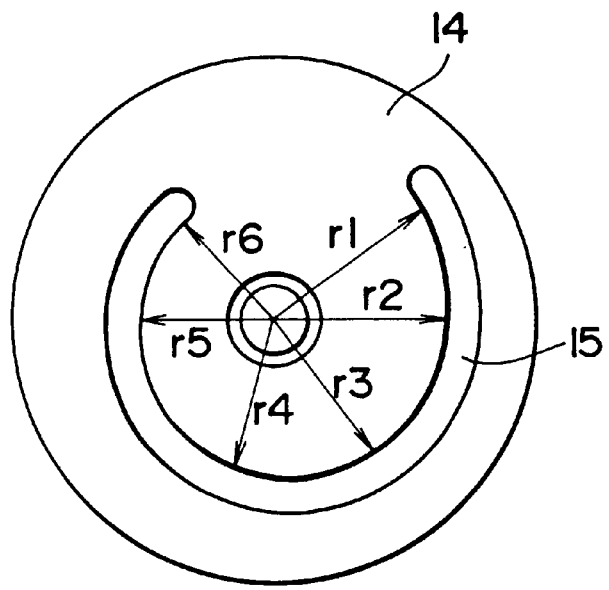
FIG. 3 is an explanatory view of a skew adjusting mechanism of the disk drive device according to the embodiment.

FIG. 2 is a perspective view of a reproduce drive portion (referred to as a mechanism deck portion) of a disk in a disk drive device.

According to the mechanism deck, various mechanisms necessary for driving to reproduce a disk are installed on a sub chassis main body 11. A loaded disk is mounted on a turn table 7 and the disk is rotated when the turn table 7 is driven to rotate by a spindle motor 6.

According to a pickup 1 for irradiating a laser beam to the rotating disk and sampling information from a reflected light thereof, a CD pickup 1a having an optical system and a laser beam source which are optimized to CD and a DVD pickup 1b having an optical system and a laser beam source which are optimized to DVD, are provided inside of a cabinet of the pickup 1 as illustrated, independently from each other. A laser output end of the CD pickup 1a is an object lens 2a for CD and a laser output end of the DVD pickup 1b is an object lens 2b for DVD.

The pickup 1 is slidable in the radius direction of the disk by a so-called sled mechanism. Therefore, a main shaft 8a and a sub shaft 12 are installed on the both sides of the pickup 1. The main shaft 8a is inserted into a holder portion 8g of the pickup 1 and the sub shaft 12 is inserted into a holder portion on the opposite side, not illustrated, by which the pickup 1 is movable in the shaft direction in a state supported by the main shaft 8a and the sub shaft 12.

As a mechanism for moving the pickup 1 on the shafts, a sled motor 8b and sled transmission gears 8c, 8d and 8e are installed and a rack gear 8f is installed at a vicinity of the holder portion 8g of the pickup 1.

By driving to rotate the sled motor 8b, the rotational force is transmitted to the sled transmission gears 8c, 8d and 8e. The sled transmission gear 8e is in mesh with the rack gear 8f and therefore, the transmitted rotational force moves the pickup 1 in the shaft direction. Therefore, by regularly and reversely rotating the sled motor 8b, the pickup 1 is moved in directions toward inner and outer peripheries of the disk.

Further, the pickup 1 is movable in an inclined direction so as to perform so-called skew correction in accordance with an inclined state of the loaded disk.

Therefore, one end of the main shaft 8a is mildly held by the sub chassis main body 11 via a holding portion 8h and other end thereof is fitted into a cam groove 15 formed in a skew gear 14.

The rotational motion of a skew motor 9 is transmitted to the skew gear 14 via a transmission gear 13.

As shown by FIG. 13, the cam groove 15 in the skew gear 14 is formed in a U-like shape drawing a spiral curve. When a distance from the center of rotation of the skew gear 14 to the cam groove 15 is designated by notation r, the distances at the respective portions are in a relationship of r1>r2>r3>r4>r5>r6.

Accordingly, when the main shaft 8a is supported under a state where one end of the main shaft 8a is fitted to the cam groove 15, the inclined state of the main shaft 8a is set by a rotational position of the skew gear 14. That is, the inclined state of the pickup 1 can be adjusted by driving the skew motor 9.

A skew sensor 10 is mounted to the pickup 1 for detecting the inclined state of the pickup 1 relative to the disk. The skew sensor 10 detects the skew state by measuring, for example, a time period during which outputted light is reflected by the disk and received by the sensor. When the skew motor 9 is driven based on the skew state detected by the skew sensor 10, in respect of the inclined state of the pickup 1, the relative inclined state can be corrected in conformity with the loaded disk.

Figure 4A:
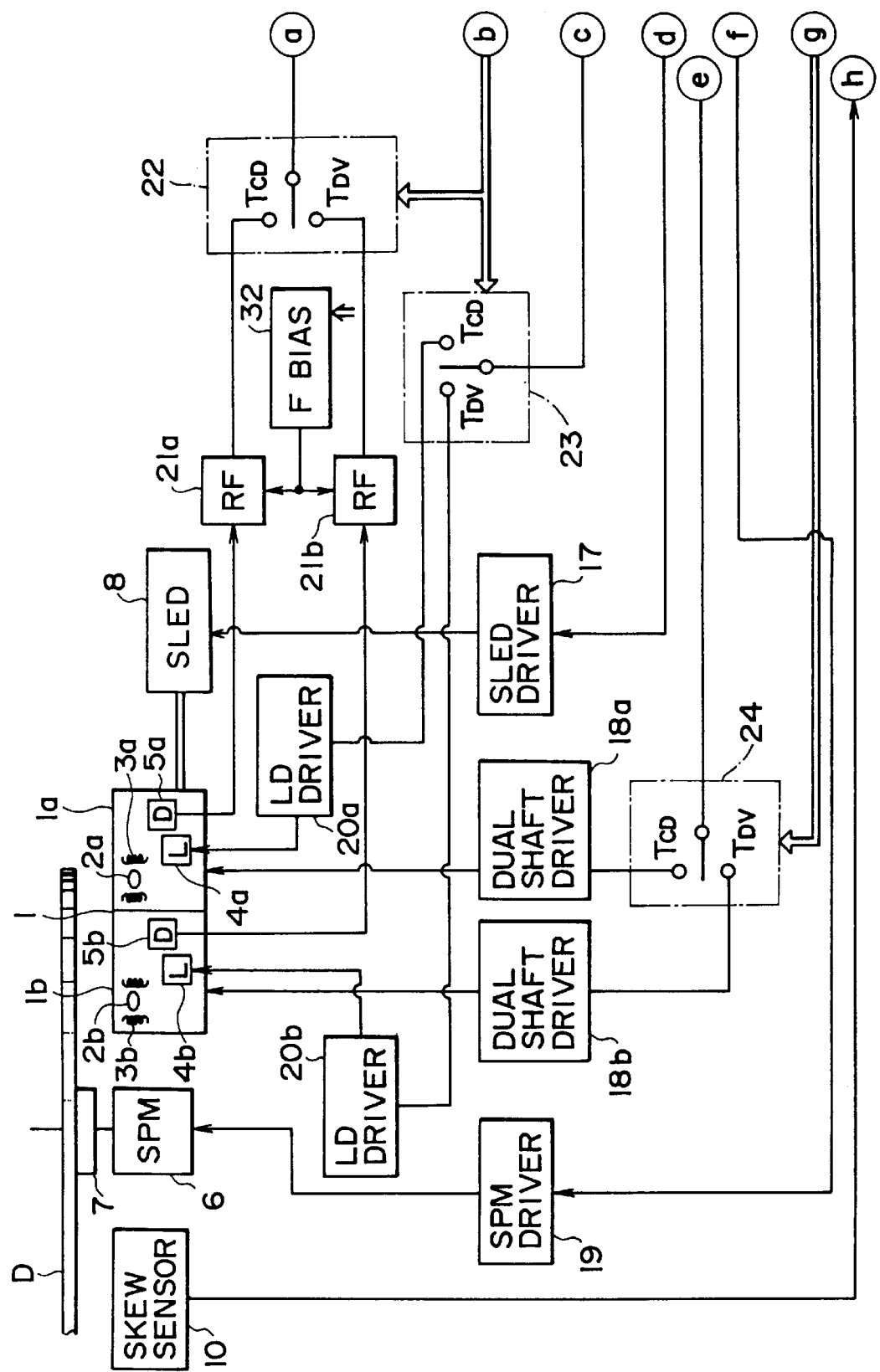
FIG. 4 is a block diagram of essential portions of the disk drive device on which the evaluation signal forming apparatus according to the embodiment of the present invention is mounted.

FIG. 4 is a block diagram of essential portions of the disk drive device.

The disk D is mounted on the turn table 7 illustrated also by FIG. 2 and is driven to rotate by the spindle motor 6 at a constant linear velocity (CLV) or a constant angular velocity (CAV).

The pickup 1 reads data recorded on the disk D in a bit mode. As mentioned above, the pickup 1 is actually provided with two independent pickups (CD pickup 1a, DVD pickup 1b).

An optical system that is optimum to CD is provided in the CD pickup 1a. According to a laser diode 4a constituting a laser beam source, for example, the central wavelength of outputted laser is 780 nm and NA=0.45 with respect to the object lens 2a for CD. The object lens 2a for CD is held movably in a tracking direction and a focusing direction by a dual shaft mechanism 3a.

An optical system that is optimum to DVD is provided in the DVD pickup 1b. According to a laser diode 4b constituting a laser beam source, for example, the central wavelength of outputted laser is 650 nm or 635 nm and NA=0.6 with respect to the object lens 2b for DVD. The object lens 2b for DVD is held movably in a tracking direction and a focusing direction by a dual shaft mechanism 3b.

When the disk D is CD, a reproducing operation is carried out by using the CD pickup 1a. Information of reflected light from the disk D is detected by a detector 5a and the information is converted into an electric signal in accordance with an amount of received light and is supplied to an RF amplifier 21a.

When the disk D is DVD, the reproducing operation is carried out by using the DVD pickup 1b. According to the DVD pickup 1b, information of reflected light from the disk D is detected by a detector 5b and the information is converted into an electric signal in accordance with an amount of received light and is supplied to an RF amplifier 21b.

Each of the RF amplifier 21a and 21b is provided with current/voltage conversion circuits, amplifier circuits, matrix calculation circuits and the like, and forms a necessary signal based on signals from the detector 5a or 5b. For example, the amplifiers form RF signals such as reproduce data, focus error signals FE for servo control, tracking error signals TE, pull-in signals referred to as sum signals and the like.

Figure 5:
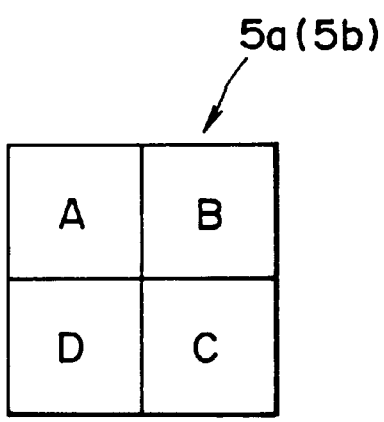
FIG. 5 is an explanatory view of a four divisions detector of the disk drive device according to the embodiment.

As shown by FIG. 5, each of the detectors 5a and 5b is a four divisions detector comprising so-called detecting portions A, B, C and D. In this case, the focus error signal FE is formed by outputs from the detecting portions A, B, C and D through calculation of (A+C)−(B+D).

Further, a pull-signal is represented by PI=(A+B+C+D).

With respect to the tracking error signal TE, when a so-called three beams system is considered, detectors E and F for side spots are prepared as well as the four divisions detector of FIG. 4 and the tracking error signal TE may be formed by calculation of E−F or can be formed as a push pull signal from the four divisions detector.

Various signals formed by the RF amplifier 21a are respectively supplied to a binarizing circuit 25 and a servo processor 31 via a $T_{CD}$ terminal of a switch 22. That is, when the disk D is CD, in the switch 22 the $T_{CD}$ terminal is selected and reproduced RF signal from the RF amplifier 21a is supplied to the binarizing circuit 25 and the focus error signal FE, the tracking error signal TE and the pull-in signal PI are supplied to the servo processor 31.

Also, various signals formed by the RF amplifier 21b are supplied to the binarizing circuit 25 and the servo processor 31 via a $T_{DV}$ terminal of the switch 22, respectively. That is, when the disk D is DVD, in the switch 22 the $T_{DV}$ terminal is selected and the reproduced RF signal from the RF amplifier 21b is supplied to the binarizing circuit 25 and the focus error signal FE, the tracking error signal TE and the pull-in signal PI are supplied to the servo processor 31.

A reproduced RF signal provided by the RF amplifier 21a or 21b is binarized by the binarizing circuit 25 and converted into a so-called EFM signal (8–14 modulated signal: in the case of CD) or EFM+signal (8–16 modulated signal: in the case of DVD) and supplied to a decoder 26. The decoder 26 reproduces information read from the disk D by carrying out FEM demodulation, CIRC decoding or the like and further, CD-ROM decoding, MPEG decoding and the like as necessary.

The EFM signal from the binarized circuit 25 is supplied to a PLL circuit 34 to form a reproduce clock PLCK constituting a reference of processes in the decoder 26. The PLL circuit 34 forms a reproduce clock PLCK in synchronism with the EFM signal based on an edge detecting signal of the EFM signal and supplies it to necessary portions.

Further, the EFM signal is supplied also to an evaluation signal forming circuit 35 although details will be described later, the evaluation signal forming circuit 35 forms an evaluation signal HS which is an analog signal in accordance with quality of signal from the EFM signal and the reproduce clock PLCK. The evaluation signal HS is supplied to an input port having an A/D conversion function in a system controller 30 by which the system controller 30 can take in the value of the evaluation signal HS that is an analog signal.

The servo processor 31 executes a servo operation by forming various servo drive signals for focusing, tracking and treading operation and the spindle from the focus error signal FE and the tracking error signal TE from the RF amplifiers 21a and 21b, a spindle error signal SPE from the decoder 26 or the system controller 30 and the like.

That is, a focus drive signal and a tracking drive signal are formed in accordance with the focus error signal FE and the tracking error signal TE, and are outputted to a switch 24. According to the switch 24, a $T_{CD}$ terminal is selected when the disk D is CD and a $T_{DV}$ terminal is selected when the disk D is DVD.

The focus drive signal an d the tracking drive signal which are formed in accordance with the focus error signal FE and the tracking error signal TE from the RF amplifier 21a, are supplied to a dual shaft driver 18a in reproducing CD, and the dual shaft driver 18a drives the dual shaft mechanism 3a in the CD pickup 1a. Thereby, a tracking servo loop and a focusing servo loop are formed by the CD pickup 1a, the RF amplifier 21a, the servo processor 31 and the dual shaft driver 18a.

Further, in reproducing DVD, the focus drive signal and the tracking drive signal which are formed by the servo processor 31 in accordance with the focus error signal FE and the tracking error signal TE from the RF amplifier 2b, are supplied to a dual shaft driver 18b and the dual shaft driver 18b drives the dual shaft mechanism 3b in the DVD pickup 1b. Thereby, a tracking servo loop and a focusing servo loop are formed by the DVD pickup 1b, the RF amplifier 21b, the servo processor 31 and the dual shaft driver 18b.

The object lens 2a or 2b is driven by the focusing servo loop in a direction approaching or leaving the disk D. The movement of the object lens 2a or 2b is always controlled to carry out in a direction of nullifying the focus error signal FE, by which the focused state of the laser beam is maintained.

Incidentally, although in an ideal state, a point nullifying the focus error signal should coincide with a point capable of reproducing information from the disk D most efficiently (with excellent signal quality), actually, these points are shifted from each other. The amount of shift is referred to as focus bias. The focus state is controlled to converge to a point maximizing quality of reproduce signal by constituting a servo system such that a bias voltage corresponding to the amount of focus bias is added to the focus error signal FE.

To set the focus bias in such a manner, a focus bias setting portion 32 is provided by which the bias voltage is supplied to the RF amplifiers 21a and 21b. The outputted bias voltage value can be adjusted to change by the system controller 30. Further, according to the RF amplifiers 21a and 21b, the focus error signal FE is constituted by adding a value obtained by the above-mentioned calculation of (A+C)−(B+D) with the supplied bias voltage.

The servo processor 31 supplies a spindle motor driver 19 with a spindle drive signal formed in accordance with the spindle error signal SPE. The spindle motor driver 29 supplies the spindle motor 6 with, for example, three-phase drive signals in accordance with the spindle drive signal and has the spindle motor 6 execute CLV rotation. Also, the servo processor 31 generates the spindle drive signal in accordance with a spindle-kick/brake control signal from the system controller 30 and has the spindle motor 6 execute operation of starting or stopping or the like by using the spindle motor driver 19.

The servo processor 31 forms a sled drive signal based on, for example, a sled error signal obtained from the tracking error signal TE or the like, access execution control from the system controller 30 or the like and supplies the sled drive signal to a sled driver 17. The sled driver 17 drives a sled mechanism 8 in accordance with the sled drive signal. The sled mechanism 8 designates portions of the main shaft 8a, the sled motor 8c, the sled transmission gears 8c, 8d and 8e or the like. That is, the proper sliding movement of the pickup 1 is carried out when the sled driver 17 drives the sled motor 8b in accordance with the sled drive signal.

The laser diode 4a in the CD pickup 1a is driven to emit a laser beam by a laser driver 20a. The laser diode 4b in the DVD pickup 1b is driven to emit a laser beam by the laser driver 20b.

The servo processor 31 generates and supplies to the switch 23 a laser drive signal for executing laser emission at the pickup 1 in reproducing operation or the like. According to a switch 23, a $T_{CD}$ terminal is selected when the disk D is CD and a $T_{DV}$ terminal is selected when the disk D is DVD. Accordingly, either of the laser diodes 4a and 4b emits a laser beam in accordance with the disk that is to be reproduced.

Further, the servo processor 31 is supplied with also detect information from the skew sensor 10. The servo processor 31 supplies a skew driver 16 with a skew drive signal in accordance with the detect information from the skew sensor 10 and drives the skew motor 9. Thereby, the skew servo operation explained in reference to FIG. 2 is realized.

Further, in respect of the skew servo operation, an optimum initial state is adjusted between the loaded disk D and the pickup 1 and further, the skew servo operation is carried out in accordance with the detect information from the skew sensor 10. The system controller 30 carries out skew adjustment driving by making OFF the skew servo operation in order to provide the initial state. Further, the skew state at a time point when signal quality is maximized, is set to constitute an optimum skew initial state and thereafter, the skew servo operation is successively carried out.

The above-described various operations of servo control, decoding and the like are controlled by the system controller 30 formed by a microcomputer.

For example, operations of start and finish of reproducing, track access, quick feed reproducing, quick return reproducing and the like are realized when the system controller 30 controls the operations of the servo processor 31 and the pickup 1.

Since the disk drive device is a device in correspondence with both of CD and DVD, when the disk D is loaded, whether the disk D is CD or DVD must be determined. Further, as described above, the pickup 1 (1a, 1b), the RF amplifiers 21a and 21b, the laser drivers 20a and 20b, the dual shaft drivers 18a and 18b, each is installed exclusively for CD or DVD. The system controller 30 must carry out control for switching the switches 22, 23 and 24 to either ones of the $T_{CD}$ terminals and the $T_{DV}$ terminals in accordance with the result of determining the disk in order to pertinently use the exclusive circuit systems.

There have been conceived, for example, a method of observing a pull-in signal or a focus error signal while moving the object lens 2 and a method of determining the disk D by reading data of TOC and the like in order to determine the kind of the disk D although a detailed explanation will be omitted since it is not directly related to the present invention.

2. Constitution and Operation of an Evaluation Signal Forming Circuit

Figure 6:
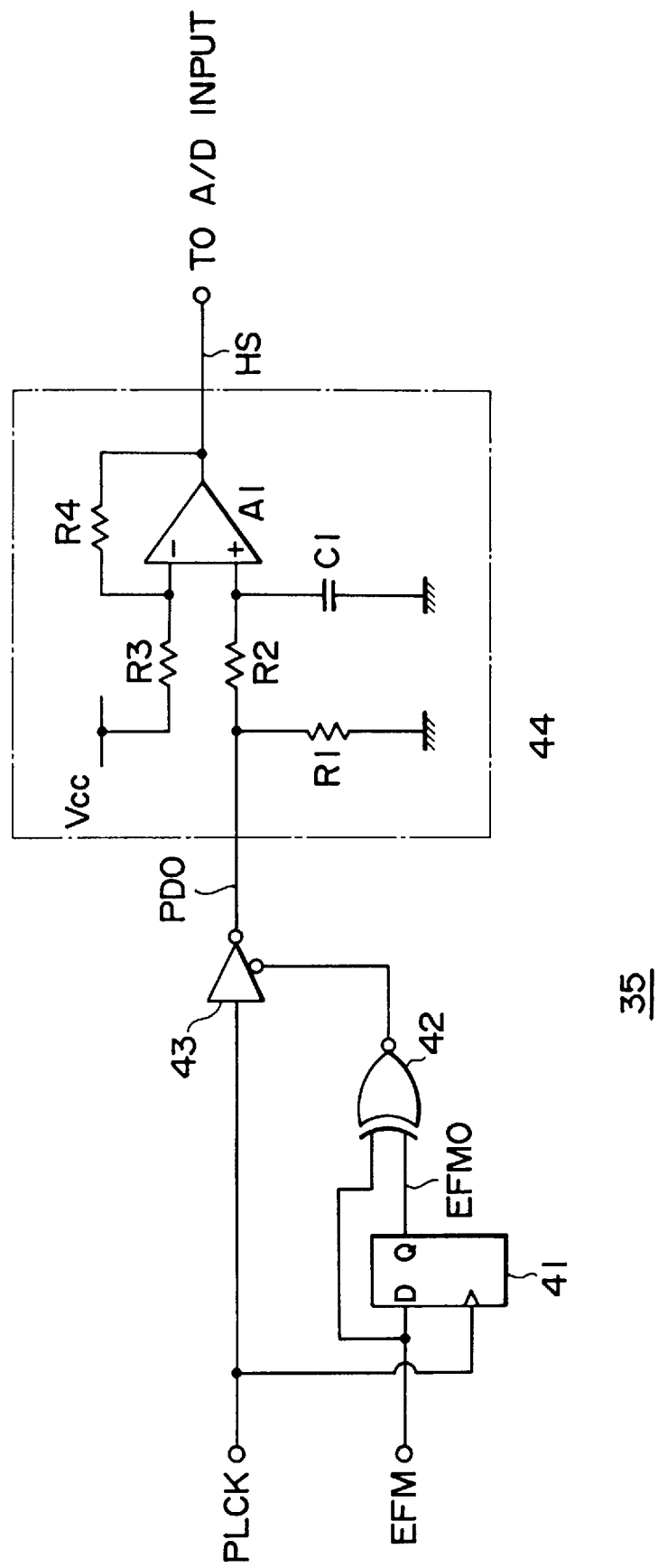
FIG. 6 is a block diagram of the evaluation signal forming apparatus according to the embodiment.

As shown by FIG. 4, the evaluation signal forming circuit 35 is supplied with the EFM signal and the reproduce clock PLCK and the evaluation signal forming circuit 35 forms the evaluation signal HS by being constituted as shown by FIG. 6. According to the operation signal HS, the phase error information between the phase of the EFM signal and the phase of the reproduce clock PLCK is converted into an absolute value and converted into an analog signal.

As shown by FIG. 6, the evaluation signal forming circuit 35 is constituted by a D flip flop 41, an exclusive OR gate (hereinafter, referred to as EX-OR gate) 42, an inverter 43 and a low pass filter plus amplifier unit (hereinafter, referred to as LPF/amplifier) 44. The LPF/amplifier 44 is provided with resistors R1 and R2 and a condenser C1 constituting a low pass filter and further, an amplifier A1 and resistors R3 and R4 constituting a differential amplifier circuit.

The supplied EFM signal is supplied to the D flip flop 41 and the EX-OR gate 42. Further, the reproduce clock PLCK is supplied as a latch clock of the D flip flop 41. Accordingly, an EFMO signal formed by latching the EFM signal at an edge timing of the reproduce clock PLCK is outputted from the D flip flop 41 and the EFMO signal is supplied to other end of the EX-OR gate 42.

According to the EX-OR gate 42, an exclusive logical sum of the EFM signal and the EFMO signal is invertedly outputted as a control signal for the inverter 43.

The reproduce clock PLCK is inputted to the inverter 43. When the control signal outputted from the EX-OR gate 42 is at "H", the output of the inverter 43 is at high impedance state (hereinafter, referred to as Hi-Z) irrespective of the reproduce clock PLCK. When the control signal outputted from the EX-OR gate 42 is at "L", the inverter 43 outputs an inverted level of the reproduce clock PLCK. That is, the signal PDO that is the output from the inverter 43 comprises three value signals of "H", "L" and "Hi-Z". Further, the signal PDO constitutes phase error information between the phase of the EFM signal and the reproduce clock PLCK.

FIGS. 7A, 7B, 7C and 7D and FIGS. 8A, 8B, 8C, 8D and 8E show examples of formed waveforms of the signal PDO constituting the phase error information.

Figure 7:
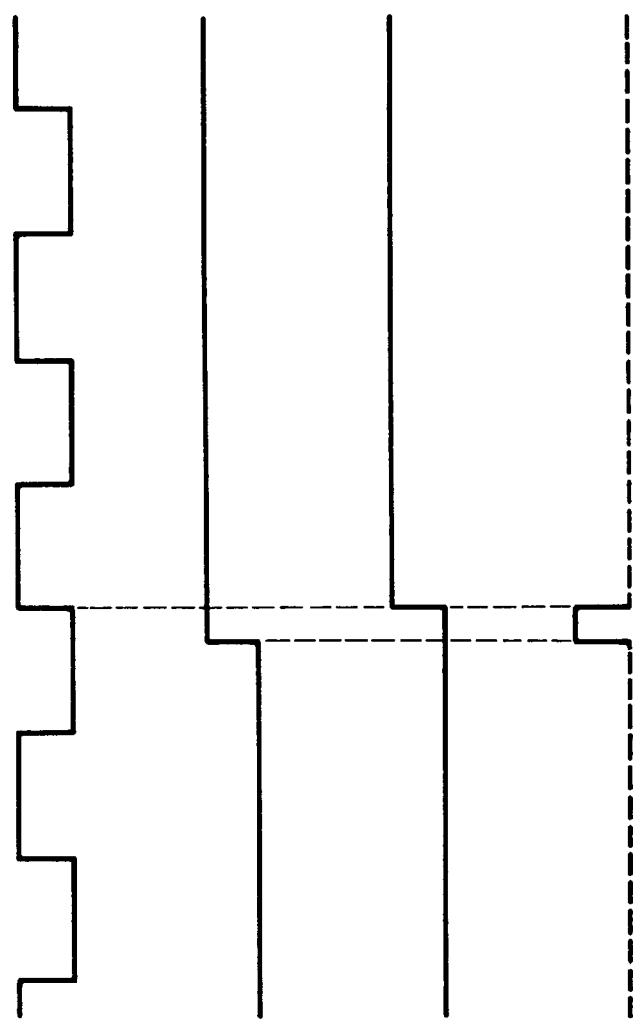
FIGS. 7A, 7B, 7C and 7D are explanatory views of an operation of detecting an absolute value of a phase error in the evaluation signal forming apparatus according to the embodiment.
Figure 8:
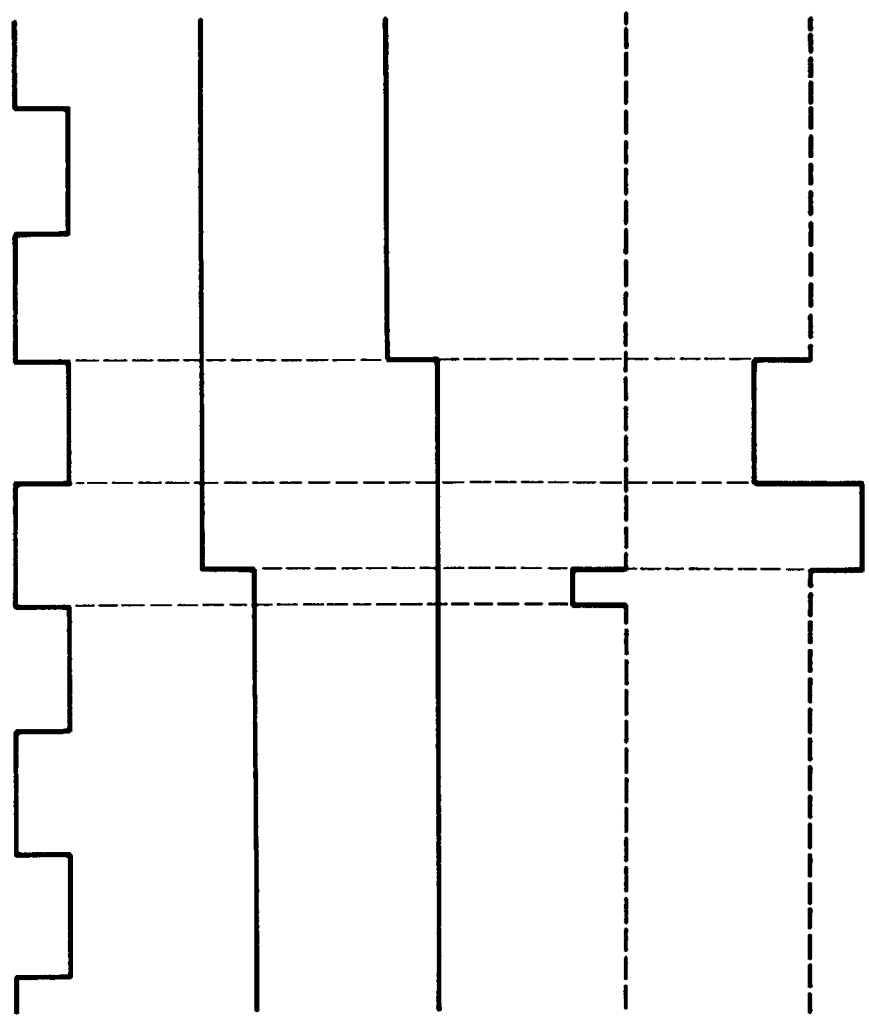
FIGS. 8A, 8B, 8C, 8D and 8E are explanatory views of an operation of detecting the absolute value of the phase error in the evaluation signal forming apparatus according to the embodiment.

FIGS. 7A, 7B, 7C and 7D show a case where the phase of the EFM signal is advanced compared with the phase of the reproduce clock PLCK and FIGS. 7A and 7B show the reproduce clock PLCK and the EFM signal. FIG. 7C shows the EFMO signal that is the latch output of the D flip flop 41.

The control signal outputted from the EX-OR gate 42, becomes "L" only when the logical levels of the EFM signal and the EFMO signal are different from each other and the control signal becomes "H" when the EFM signal and the EFMO signal are "H" and "H", or "L" and "L". Accordingly, during a time period where the EFM signal and the EFMO signal are at the same logical level, the signal PDO becomes "Hi-Z". The level designated by a dotted line in FIG. 7D is "Hi-Z".

Meanwhile, the time period where the logical levels of the EFM signal and the EFMO signal are different from each other, is nothing but time period in accordance with the phase error between the reproduce clock PLCK and the EFM signal. In this case, the inverter 43 invertedly outputs the reproduce clock PLCK and therefore, as the signal PDO, a pulse at "H" level having a pulse width in accordance with the phase error amount (absolute value) as shown by FIG. 7D, is provided. Further, the pulse shows the absolute value of an amount of phase advancement.

FIGS. 8A, 8B, 8C, 8D and 8E show a case where the phase of the EFM signal is delayed compared with the phase of reproduce clock PLCK and FIGS. 8A, 8B and 8C show the reproduce clock PLCK, the EFM signal and the EFMO signal.

Here, as shown by FIG. 8D, a signal X-PDO is a pulse signal having a pulse width in accordance with the phase error amount (absolute value) between the reproduce clock PLCK and the EFM signal and accordingly, it is a signal having a property similar to that of the signal PDO in the case of phase advancement in FIG. 7D. However, when the phase of the EFM signal is delayed, even if the signal X-PDO is intended to form, whether an edge of the EFM signal emerges at a timing delayed from a timing of an edge of the reproduce clock PLCK cannot be anticipated and therefore, the signal X-PDO cannot be formed.

Hence, when the phase of the EFM signal is delayed compared with the phase of the reproduce clock PLCK, the signal PDO in accordance with the phase error amount (absolute value) is as shown by FIG. 8E. That is, FIG. 8E shows a pulse outputted from the inverter 43 in FIG. 6 when the phase of the EFM signal is delayed. The pulse signal is a signal which necessarily becomes a positive value (absolute value) when it is integrated.

First, the signal PDO becomes "Hi-Z" as shown by a dotted line in FIG. 8E during a time period where the EFM signal and the EFMO signal are at the same logical level.

Meanwhile, the inverter 43 invertedly outputs the reproduce clock PLCK during a time period where the logical levels of the EFM signal and the EFMO signal are different from each other. Accordingly, as shown by FIG. 8E, the signal PDO becomes "L" during a time period from an edge of the EFM signal to a successive counter edge (falling edge) of the reproduce clock PLCK and the signal PDO becomes "H" during a time period from the counter edge of the reproduce clock PLCK to a successive edge (rising edge).

Such a signal PDO is equivalent to the signal X-PDO. The signal PDO and the signal X-PDO which have been converted into absolute values by being subjected to a low pass filter, becomes equivalent signals (analog signals having certain signal levels). Accordingly, the signal PDO in FIG. 8 in the case of phase delay also shows the phase error amount (absolute value).

Incidentally, although the signals PDO formed at the timing of an edge (rising edge) of the EFM signal are shown in FIG. 7D and FIG. 8D, according to the example of the circuit in FIG. 6, similar signals PDO are formed even at a timing of a counter edge (falling edge) of the EFM signal.

The signal PDO outputted from the inverter 43 in this way is subjected to low pass filter processing (integration processing) and amplifying processing at the LPF/amplifier 44 by which the evaluation signal HS as an analog signal having a signal level (level of absolute value) in correspondence with the phase error amount, is constituted.

Further, the evaluation signal HS is supplied to the input port of A/D conversion of the system controller 30, converted into a digital value and is received by the system controller 30. According to the system controller 30, the evaluation signal HS can be constituted as a measure for evaluating signal quality.

That is, according to the example, the evaluation signal capable of accurately evaluating quality of reproduce signal can be formed by a very simple circuit constitution, there is no problem in mounting the apparatus to, for example, a disk drive device and accordingly, the system controller 30 can automatically carry out various adjusting operations while confirming the evaluation signal HS.

As described above, the evaluation signal HS is formed by detecting the phase error information between the EFM signal and the reproduce clock PLCK. According to the PLL circuit 34 of FIG. 4, the phase error information between the EFM signal and the reproduce clock PLCK is detected for forming the reproduce clock PLCK and the reproduce clock PLCK is formed by constituting control input of an oscillator by the phase error information. Accordingly, although the PLL circuit 34 and the evaluation signal forming circuit 35 are constituted by separate blocks for convenience of explanation, for example, the evaluation signal forming circuit 35 can be realized by adding a circuit system outputting detected phase error information as signal level information to the PLL circuit 34.

Incidentally, according to the example, the absolute value of the phase error information is outputted. The reason is that if the phase error information is the phase error information per se used in the PLL circuit, so far as the loop of the PLL circuit is closed, the average value when the phase error information is subjected to the low pass filer as it is, becomes constant (central value) irrespective of quality (jitter) of signal and accordingly, when the evaluation signal HS is outputted as an analog signal, it is pertinent to output an absolute value thereof.

Incidentally, although according to the above-described example, the evaluation value HS is formed by outputting the absolute value of the phase error in both of the case where the phase of the EMF signal is advanced and the case where it is delayed, the absolute value of the phase error may be outputted only in the case where the phase is advanced or the case where the phase is delayed.

Further, when the evaluation signal HS is formed by either one of phase advancement and phase delay, the absolute value may not necessarily be constituted.

3. Focus Bias Adjusting Operation

An explanation will be given of the focus bias adjusting operation executed by the system controller 30 by using the above-described evaluation signal HS.

As mentioned above, a bias voltage set by the bias setting portion 32 is added to the focus error signal FE. The bias voltage value is generally formed by adjusting the value to a best point in respect of RF jitter.

Figure 9:
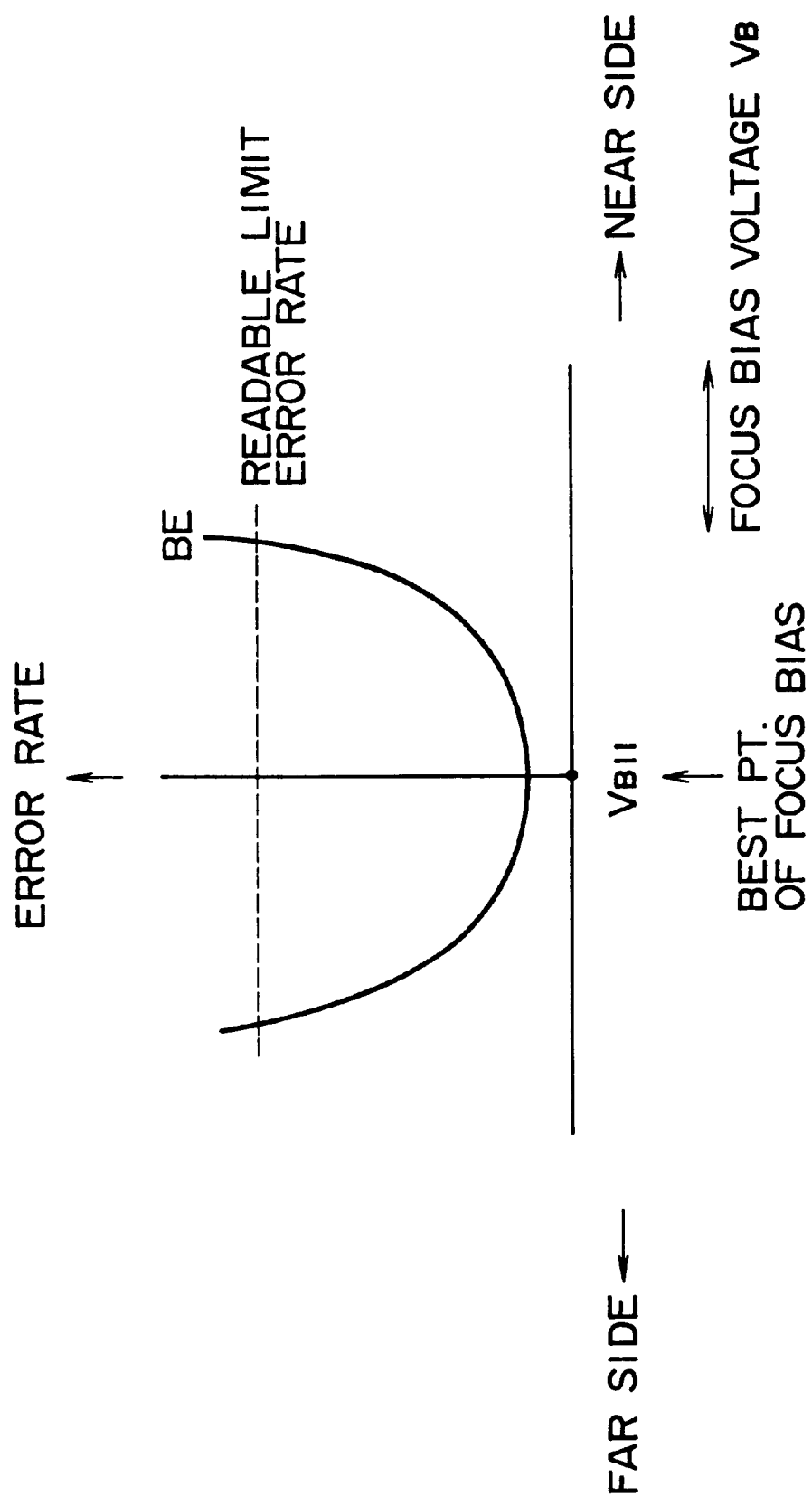
FIG. 9 is an explanatory view for adjusting focus bias.

FIG. 9 shows an error rate BE (hereinafter, referred to as block error rate) of a reproduce signal in respect of a focus bias voltage value $V_B$.

Here, when the bias voltage is changed from the near side (in a direction where the object lens 2 approaches the disk D) and the far side (in a direction where the object lens 2 leaves the disk D), the block error rate BE becomes large and constitutes a readable limit error rate at certain points.

The best point in respect of jitter is a point of a central point between two points constituting readable limit error rate on the near and the far side, that is, the point minimizing the error rate and is a point where the focus bias voltage value=$V_{B11}$ in FIG. 9.

Further, the bias voltage value supplied from the focus the bias setting portion 32 to the RF amplifiers 21a and 21b, is adjusted to the voltage value $V_{B11}$ constituting the best point in respect of jitter.

According to the example, the system controller 30 executes the processing of adjusting the focus bias voltage value to an optimum value while confirming the evaluation signal HS.

Figure 10:
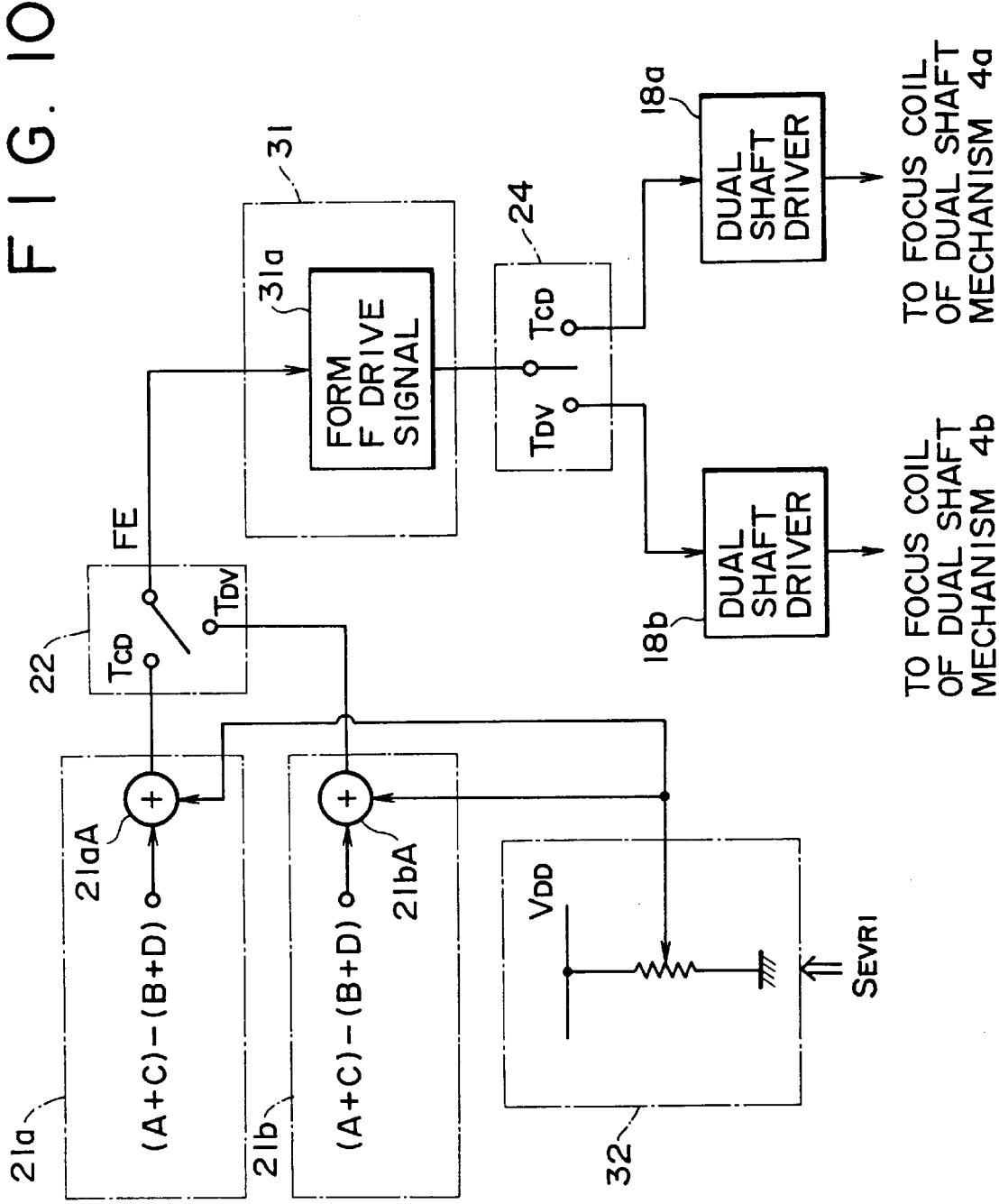
FIG. 10 is a block diagram of a focus servo system according to the embodiment.

FIG. 10 shows a block diagram of essential portions of a focus servo system. The focus bias setting portion 32 is constituted by an electronic volume for taking out a desired voltage value from, for example, a power source voltage $V_{CC}$ and when the electronic volume changes resistance value by a control signal $S_{EVR1}$ from the system controller 30, the bias voltage value given to the focus error signal is variably set.

According to the RF amplifiers 21a and 21b, as mentioned above, the focus error signal FE is formed by calculation of (A+C)–(B+D). Actually, the bias set by the focus bias setting portion 32 is added. That is, as illustrated, the RF amplifiers 21a and 21b are respectively provided with adders 21aA and 21bA and the bias voltage base on the resistance value of the electronic volume at the focus bias setting portion 32, is added to the respective focus error signals FE of (A+C)–(B+D) at the adders 21aA and 21bA.

Further, the focus error signal FE added with the bias voltage is supplied to a focus drive signal forming portion 31a in the servo processor 31. In the focus drive signal forming portion 31a, a focus drive signal is formed by performing phase compensation or other necessary processes with respect to the focus error signal FE and supplied to the dual shaft driver 18a or the dual shaft driver 18b via the switch 24. The dual shaft driver 18a or the dual shaft driver 18b controls current applied to a focus coil of the dual shaft mechanism 4a or the dual shaft mechanism 4b in accordance with the focus drive signal. Thereby, the object lens 2a or 2b is moved in directions approaching and leaving the disk D in accordance with the focus error signal FE.

Figure 11:
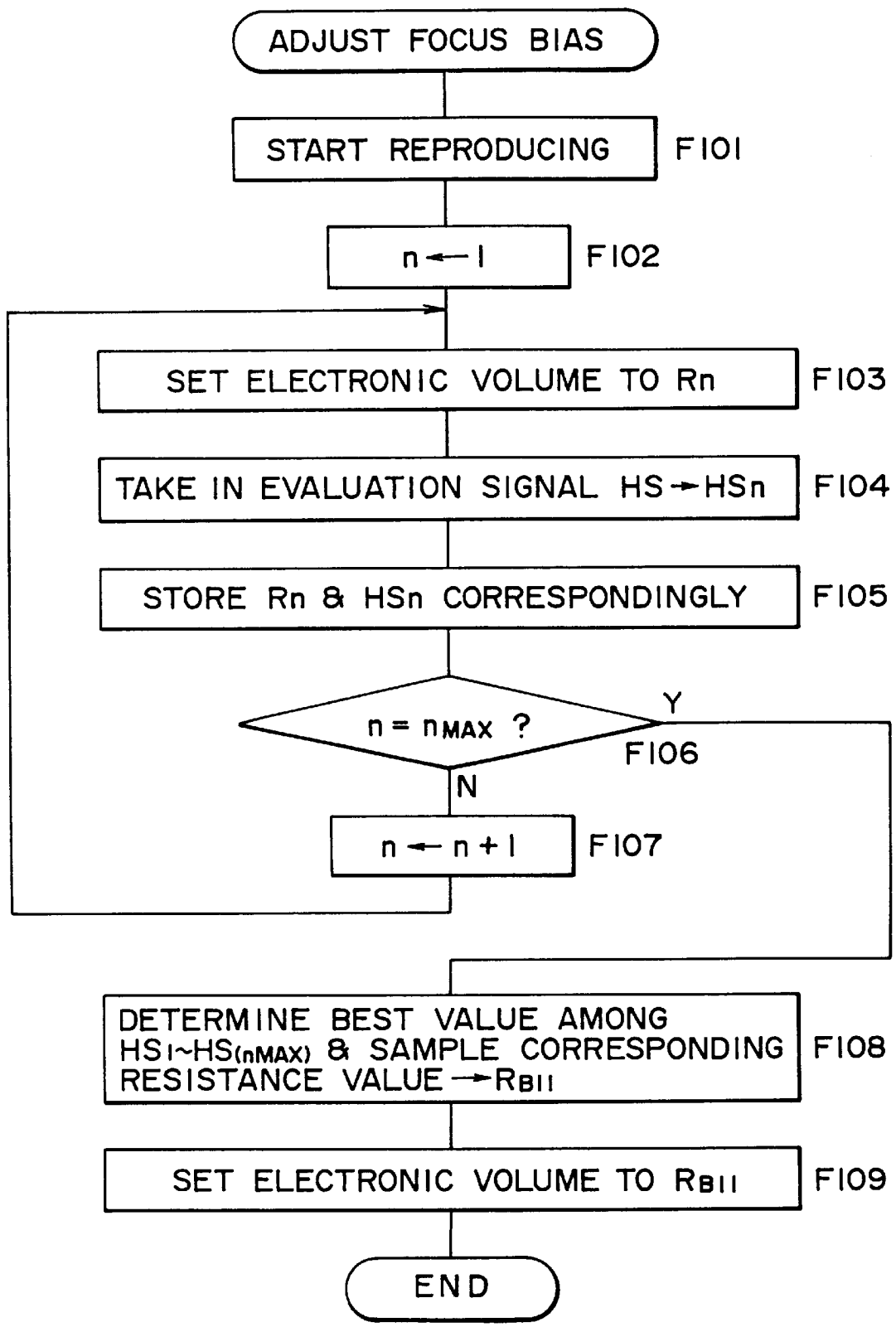
FIG. 11 is a flowchart of a n example of processes of adjusting focus bias according to the embodiment.

According to the example, in respect of such a focus servo system, the system controller 30 carries out processes of adjusting automatically the focus bias value at a time point where the disk D is inserted or the like. The processes are shown in FIG. 11.

The system controller 30 determines the kind of the loaded disk D, switches the switches 22, 24 and 31 to either ones of the terminals $T_{CD}$ and $T_{DV}$ and executes the reproducing operation at step F101. At steps F102 through F107, the system controller 30 stepwisely changes the resistance value (that is, bias voltage value) of the electronic volume at the focus bias setting portion 32 and at the same time, detects the quality of the reproduce signal (EFM signal) at the respective resistance values.

The detection of quality is nothing but detecting the above-described value of the evaluation signal HS.

That is, the resistance value of the electronic volume can be changed from R1 through $Rn_{MAX}$ (F102, F103). Next, the system controller 30 takes in the evaluation signal HS provided by the reproducing operation under the state (F104). The system controller 30 sets the value of the level of the evaluation signal HS as HSn and stores it in an internal register or the like along with the resistance value Rn at that occasion (F105).

Next, the system controller 30 increments a variable n at step F107 and returns to F103. That is, the system controller 30 takes in the evaluation signal HS in the state of the resistance value of R2 and stores the signal level of the taken-in evaluation signal HSn and the resistance value Rn at that occasion.

The processes are repeated until n=$n_{MAX}$ at step F106.

When the system controller 30 takes in the values of the respective evaluation signals HS provided for the respective focus bias values in step F102 through F107 and finishes taking in the evaluation signals HS at all the stages in step 106, the system controller 30 determines a value constituting the best value (minimum value) among the evaluation signals HS1 through $HSn_{MAX}$ at step F108 and determines the resistance value of the electronic volume stored in corresponding thereto. When the value is set to the resistance value $R_{B11}$, it is the resistance value for obtaining the bias voltage $V_{B11}$ in FIG. 9. In step F109, the system controller 30 adjusts the resistance value of the electronic volume to the resistance value $R_{B11}$ by which the focus bias that is optimum to the disk (that is, signal quality can be optimized at the time point) is set.

Incidentally, the bias voltage set by the above-described operation is naturally set in correspondence with the kind of the loaded disk (CD or DVD).

By executing the above-described focus bias adjusting processes, the focus bias state that is optimum to the operational state and the operational environment can be provided and the reduction in data reproducing error and promotion of reliability of device thereby are realized.

Further, the optimum value detected by the adjusting processes may be held in, for example, non-volatile memory and may be used in later focus bias setting processes.

Also, the processes at steps F103 through F107 may not be executed at all the stages of the resistance values and if an approximate pertinent bias value is known, the resistance value is changed in a necessary range centering on the value by which the optimum point may be searched.

Mean while, although the focus bias is made variable by the electronic volume 22, for example, a PWM signal may be outputted in accordance with the focus bias value set by, for example, the system controller 11, the signal is subjected to frequency/voltage conversion by a filter circuit and is added as it is to the focus error signal as a bias value.

4. Skew Initial State Adjusting Operation

The evaluation signal HS of this example can be used also in adjusting the skew initial state.

As described above, according to the skew servo, an optimum initial state is adjusted to form between the loaded disk D and the pickup 1 and further, the skew servo operation is carried out in accordance with the detection information from the skew sensor 10. The system controller 30 carries out skew adjustment driving by making OFF the skew servo.

Figure 12:
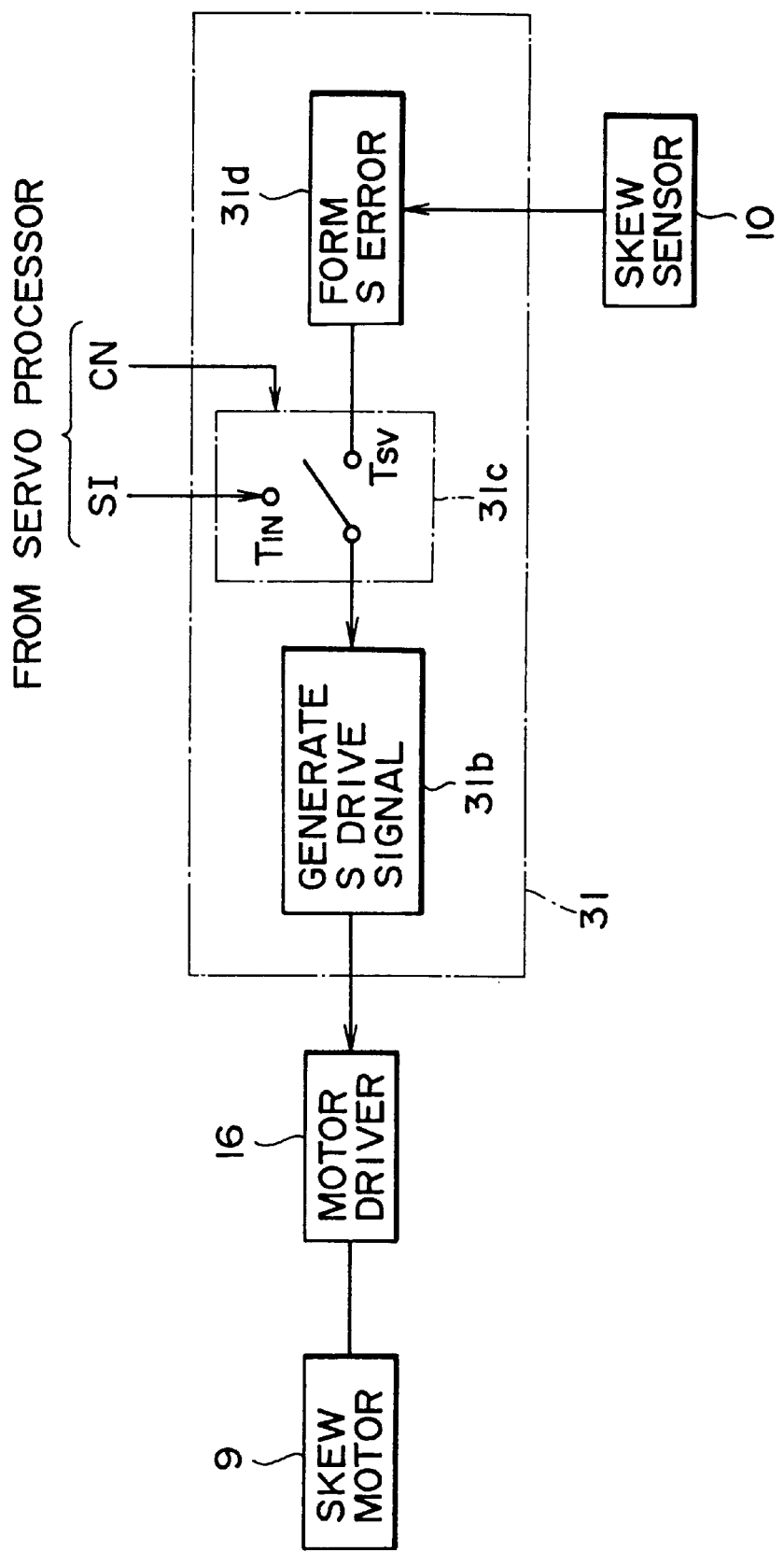
FIG. 12 is a block diagram of a skew servo system according to the embodiment.

FIG. 12 shows a skew servo system. A signal from the skew sensor 10 is supplied to a skew error signal forming portion 31*d* in the servo processor 31 by which a skew error signal corresponding to skew correction amount is formed. The skew error signal is supplied to a skew drive signal generating portion 31*b* via a terminal $T_{SV}$ of a switch 31*c* and a skew drive signal based on the skew error signal is formed. Further, the motor driver 16 drives the skew motor 9 in accordance with the skew drive signal by which the skew servo is executed.

FIG. 13 shows processes of the system controller 30 when the skew initial state is adjusted prior to execution of such a skew servo. The system controller 30, firstly, connects the switch 31*c* to a terminal $T_{IN}$ by a switch signal CN at step F201. Further, the system controller 30 starts reproducing the disk D at step F202.

Further, the system controller 30 supplies a signal SI for stepwisely moving the skew drivable range to the terminal $T_{IN}$ of the switch 31*c*. That is, a signal for generating from the skew drive signal generating portion 31*b* the skew drive signal for stepwisely changing the skew state over the skew state variable range by the skew gear 14, is supplied.

That is, when the skew state variable range is variable from the first stage to a $m_{MAX}$-th stage, firstly, m is set as m=1 whereby the fist stage of the skew state is constituted (F203, F204). Further, the evaluation signal HS provided by the reproducing operation under the state is taken in (F205). The value of the level of the taken-in evaluation signal HS is set to HSm and is stored in an inner register or the like along with the value of stage m (F206).

Successively, the variable m is incremented at step F208, and the operation returns to step F204. That is, the evaluation signal HS as skew state of the first stage is taken in and the signal level of the taken-in evaluation signal HSn and the value of stage m are stored.

The processes are repeated until $m=m_{MAX}$ at step F207.

The system controller 30 executes the reproducing operation of the disk D while changing the skew state stepwisely in this way and takes in the values of the respective evaluation signals HS provided at the respective stages. Further, when, for example, all the stages of the evaluation signals HS have been finished being taken in, a value constituting the best value (minimum value) is determined among the values of the taken-in evaluation signals $HS_m$ (that is, HS1 through $HSn_{MAX}$) and the skew state (value of stage m) corresponding thereto is determined. This is a skew state optimizing the disk (that is, optimizing the quality) at the time point and is set to the skew initial state. That is, in step F210, the skew motor 9 is driven to fall in the skew state by which the skew motor 9 is adjusted to the skew initial state.

When the initial state is set, the processes are finished by switching the switch 31*c* to the $T_{SV}$ terminal at step F211 and the above-described skew servo is executed as necessary.

By executing the skew initial state adjusting operation as described above, the optimum skew state in accordance with the operational state, the operational environment or the like is provided and accordingly, reduction in data reproducing error and promotion of reliability of devices thereby are realized.

Incidentally, also with respect to the optimum skew state detected by the skew initial state adjusting processes, for example, a value corresponding thereto may be held in a non-volatile memory or the like and may be used in later skew adjusting processes.

Further, the signal quality determination may not be performed at all the stages of varying the skew, and the processes of steps F204 through F208 may be performed only at a predetermined range of stage centering on a point considered to be optimum.

An explanation has been given of the evaluation signal forming circuit of the example, the focus bias adjusting operation and the skew initial state adjusting operation using the evaluation signal HS obtained by the evaluation signal forming circuit, however, various modified examples may be conceived as the constitution of the evaluation signal forming circuit system and examples of adjustment operation using the evaluation signal.

Further, the present invention is preferably applicable also as an evaluation signal forming apparatus mounted on a disk drive device in corresponding with a record medium other than CD or DVD.

What is claimed is:

1. A method of adjusting the skew of an optical pickup comprising the steps of:

detecting a phase error information between a phase of a read data signal read from a record medium and a phase of a clock signal formed in synchronism with the read data signal by matching the inverse said clock signal for a period corresponding to said phase error to generate a signal indicative of said phase error;

determining a value of said phase error information by filtering said signal indicative of said phase error;

outputting an evaluation signal as a digital value by analog-to-digital converting said value of said phase error information;

monitoring the evaluation signal while adjusting a relative inclination state between a loaded record medium and an optical pickup reading data on the record medium; and setting an initial skew state according to the monitored evaluation signal.

2. The method of adjusting the skew of an optical pickup according to claim 1, wherein in the step of detecting the phase error information, at least one of the phase error information when the phase of the read data signal is advanced more than the phase of the clock signal and the phase error information when the phase of the read data signal is delayed more than the phase of the clock signal, is outputted as the absolute value information of the phase error information.

3. The method of adjusting the skew of an optical pickup according to claim 1, wherein in the step of detecting the phase error information, the phase error signal having at least two levels is outputted, a first value of the phase error signal is generated during a time period from an edge timing of the read data signal to an edge timing of a next one of the clock signal when the phase of the read data signal is advanced more than the phase of the clock signal, a second value of the phase error signal is generated during a time period from an edge timing of the read data signal to a counter edge timing of the clock signal when the phase of the read data signal is delayed more than the phase of the clock signal and the first value of the phase error signal is generated during a time period from the counter edge timing to an edge timing of a next one of the clock signal.

* * * * *